United States Patent [19]

Pere

[11] Patent Number: 4,624,687
[45] Date of Patent: Nov. 25, 1986

[54] DEGASIFIER

[75] Inventor: Gérard Pere, Le Breuil, France

[73] Assignee: Creusot-Loire, Paris, France

[21] Appl. No.: 685,181

[22] Filed: Dec. 21, 1984

[51] Int. Cl.⁴ .............................................. B01D 19/00
[52] U.S. Cl. .......................................... 55/206; 55/52;
55/55; 204/266; 204/270; 210/188; 210/436
[58] Field of Search ...................... 55/52, 55, 172, 174,
55/186, 187, 193, 201, 202, 206; 204/DIG. 13,
255, 256, 257, 258, 266, 269, 270; 210/188, 436

[56] References Cited

U.S. PATENT DOCUMENTS 4,272,371 6/1981 Moses et al. ................... 210/436 X
4,376,676 3/1983 Gill .......................................... 55/206
4,505,789 3/1985 Ford ................................. 204/270 X

FOREIGN PATENT DOCUMENTS 1151507 1/1958 France .
2448378 9/1980 France .
1006739 10/1965 United Kingdom ................ 55/201

*Primary Examiner*—Charles Hart

[57] ABSTRACT

A degasifier intended for equipping an electrolysis plant, particularly a pressurized water electrolysis plant intended for the industrial production of hydrogen and oxygen.

The degasifier comprises a vertical tubular container (1) holding a stack (13) of annular plates (14) simply placed one on the other and bounding degasification compartments (23). The liquid to be degasified is fed through a pipe (8) situated in the top part of the container, and the degasified liquid passes out through an aperture (9) situated in the bottom part of said container.

10 Claims, 3 Drawing Figures

DEGASIFIER

FIELD OF THE INVENTION

The present invention relates to a degasifier intended for equipping an electrolysis plant, particularly a plant for the electrolysis of pressurized water intended for the industrial production of hydrogen and/or oxygen.

PRIOR ART

An industrial plant for the electrolysis of pressurized water, for example an installation such as that described in French Pat. No. 1,151,507, utilizes on the one hand a degasifier connected to the anolyte outlet of the electrolyzer, and on the other hand a degasifier connected to the catholyte outlet. The first of these degasifiers extracts the oxygen gas bubbles from the electrolytic liquid passing out of the electrolyzer on the anode compartment side, and the second degasifier extracts the hydrogen gas bubbles from the electrolytic liquid passing out of the electrolyzer on the cathode compartment side.

The degasified electrolytic liquids passing out of these two degasifiers are then remixed, and the resulting liquid is reinjected into the electrolyzer. The electrolytic liquid thus circulates continuously and in a closed circuit in the electrolysis plant, its flow being fixed in dependence on the output of the plant. The degasifiers have to effect thorough degasification, not only in order to obtain maximum output, but also in order to ensure that after the remixing of the degasified liquids even the slightest formation of a dangerously explosive mixture of bubbles of hydrogen gas and oxygen gas is avoided.

In these degasifiers use is made of the principle of degasification through the progressive rising of gas bubbles to the surface of the liquid. The degasification comprises the introduction of the liquid charged with gas bubbles into a container in which a liquid-gas interface is then created, and waiting for these gas bubbles to rise to this interface. They are then trapped by the gaseous volume lying above this interface, and can no longer rejoin the volume of liquid lying below the latter. The longer the liquid being degasified stays in the degasifier and the larger the liquid-gas interface, the more thorough the degasification will therefore be.

In the case of an electrolysis plant such as that defined above, the electrolytic liquid circulates continuously with a constant flow, and therefore cannot stagnate in the degasifier. In order to achieve thorough degasification, the speed of propagation of the liquid in the degasifier is reduced as much as possible, while increasing as much as possible its passage section, and the liquid-gas interface is enlarged as much as possible.

One advantageous solution for enlarging the liquid-gas interface forms the object of French Pat. No. 2,448,378 of the Applicants. A degasifier according to this French patent comprises a removable pressurized container provided with an upstream inlet for the electrolytic liquid charged with gas, a downstream outlet for the degasified liquid, and a top outlet for the extracted gas. This container holds one or more stacks of plates which are set back in relation to its inside wall and which are so arranged as to form superposed compartments, each stack being immersed in the electrolytic liquid and each compartment being provided with an upstream inlet aperture for liquid charged with gas and with a downstream outlet aperture for degasified liquid. In view of the fact that a liquid-gas interface is necessarily created in each compartment, the total liquid-gas interface is substantially increased for a passage section for the liquid and therefore a speed of flow of the latter very slightly less than in the degasifier, which would comprise only said container provided with its inlet aperture for the liquid being degasified and its outlet apertures for the degasified liquid on the one hand and the gas on the other hand.

As previously mentioned, the speed of propagation of the electrolytic liquid is lower in the degasifier than in the remainder of the circuit. This low speed promotes the phenomenon of degasification, but on the other hand also assists the decantation of impurities of all kinds. The interior of the degasifier therefore has to be removed and cleaned regularly, and in particular each compartment must be well cleaned. This cleaning is very arduous, because it is necessary to pass long rods into each compartment through the available apertures, these compartments being of slight height (a few centimeters) and of great length (several meters).

SUMMARY OF THE INVENTION

The invention relates to a degasifier of the type defined above, but completely and easily dismountable and consequently easy to clean. Its compartments are simple to manufacture and therefore inexpensive. Instead of being made with the aid of long flat metal sheets, which therefore have little rigidity, the compartments of the degasifier of the invention are formed by the simple weld-free stacking of elements which may be curved and therefore very rigid and which have relatively small dimensions. Moreover, this degasifier can easily be constructed in the form of a tall vertical tube, which is not very common for a degasifier and which has the advantage of not only requiring little horizontal space but further of allowing the degasifier also to serve as an expansion vessel for the plant.

The invention therefore relates to a compartmented degasifier of the type defined above. It is characterised in that each stack of compartments is composed, after the style of a pile of dishes, of separable plates placed one on the other, each plate being provided with a central hole, so that the stack, once formed, has a vertical passage passing axially through it from top to bottom, and each plate being in addition provided with rims forming for each compartment at least one peripheral opening to the outside and at least one central opening into said passage, while the degasifier is equipped with means for circulating electrolytic liquid, in each compartment, between at least one peripheral opening and at least one central opening, or vice versa.

BRIEF DESCRIPTION OF THE DRAWINGS

The invention will be better understood with the aid of the following description of a preferred but not limitative example of a degasifier according to the invention, given with reference to the accompanying drawings, in which.

DETAILED DESCRIPTION

Figure 1:
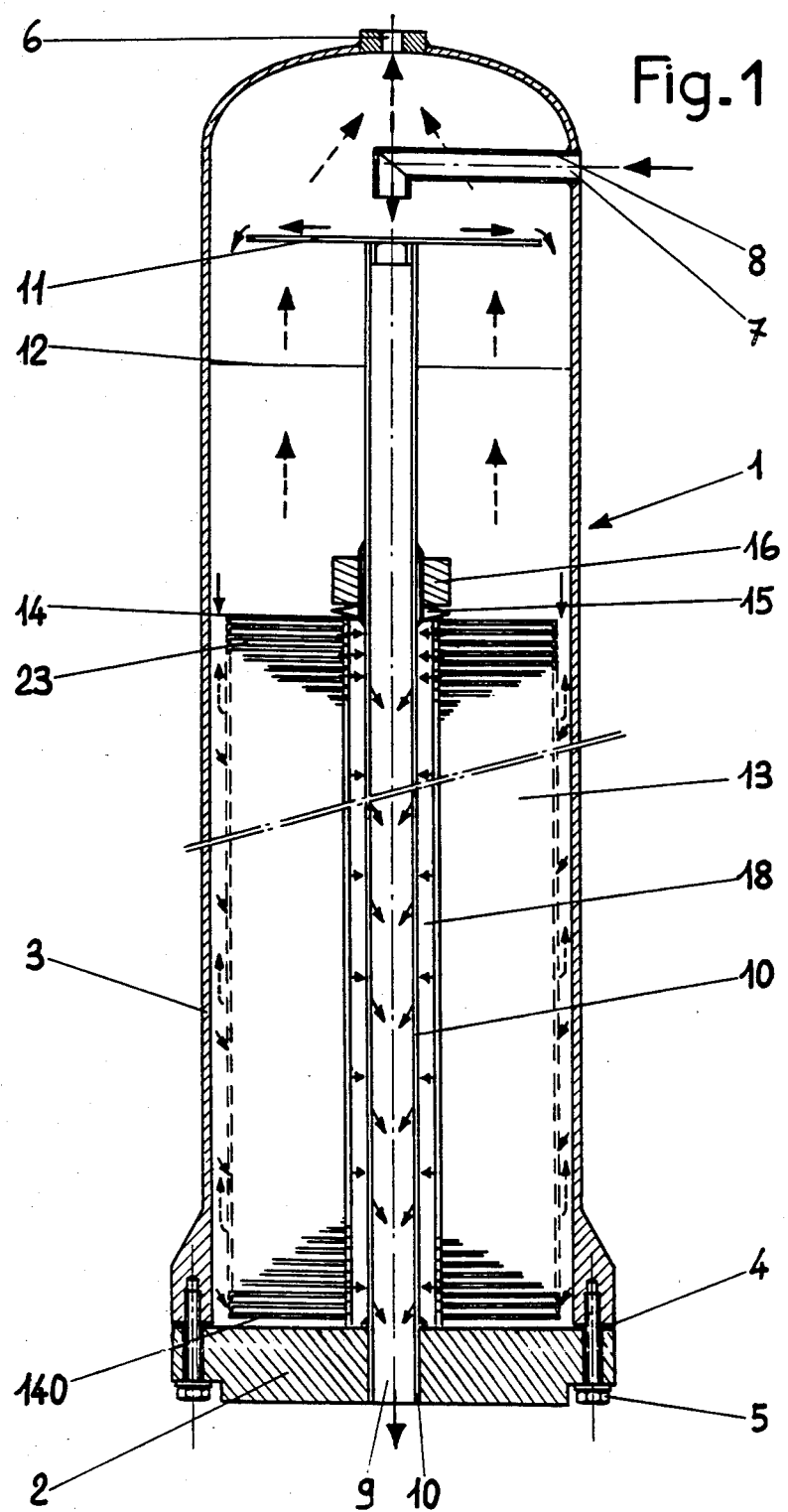
FIG. 1 is a schematic overall view of the degasifier of the invention.

Referring first to FIG. 1, the degasifier of the invention has the external appearance of a tall cylindrical tube placed in the vertical position. It comprises a pressurized container 1 composed of a horizontal base 2 and of a cylindrical portion 3 adapted to be lifted off, closed at the top end and resting by its open bottom end on the base 2 with the interposition of a seal 4. The tube 3 is clamped to the base 2 with the aid of bolts 5.

As can be seen in the drawings, the container is connected to the pressurized water electrolysis installation (not shown) by three openings:

a top outlet opening 6 for the gas extracted from the degasifier, this opening being connected by a pipe (not shown) to a gas scrubber;

a side opening 7, situated in the upper part of the tube 3, for the admission of the electrolytic liquid charged with gas bubbles coming from one of the two outlets of the electrolyser; in the container 1 this mixture of liquid and gas flows out axially from an elbowed pipe 8;

a bottom opening 9 formed in the base 2 for the discharge of the degasified liquid, which is then reintroduced into the inlets of the electrolyser after passing through, among other items, a filter and a cooling circuit.

The degasified liquid passes out at 9 via a long tube 10, the function of which will be explained later on. This tube 10, which is welded to the base 2, extends along the axis of the tubular container 1 and ends just below the outlet aperture of the elbowed pipe 8 leading into the container, as can be seen in the drawings. At that point it carries a circular horizontal deflector plate 11 screwed on in such a manner that it can easily be removed in the upward direction once the cylindrical part 3 of the container 1 has been removed. As indicated by the arrows in solid lines, which show the path of the electrolytic liquid, the liquid entering at 7 falls onto the horizontal deflector 11, flows towards the edges of the latter, and then continues its journey downwards inside the container 1, following the path which will be described later on. The container 1 is filled with liquid, the mean level of which is situated at 12, between the deflector plate 11 and the pile of compartments 13, which will be described later on. The level 12 corresponds to the maximum level of liquid in the electrolysis plant, so that, in accordance with one very interesting aspect of the invention, the container 1 also serves as expansion vessel for the plant. Since the container is tubular and vertical, the variations of the level 12 are relatively considerable in dependence on the variations of pressure, so that it is easy, if desired, to effect a regulation of pressure with the aid of a detection device (not shown) detecting the level 12.

Figure 2:
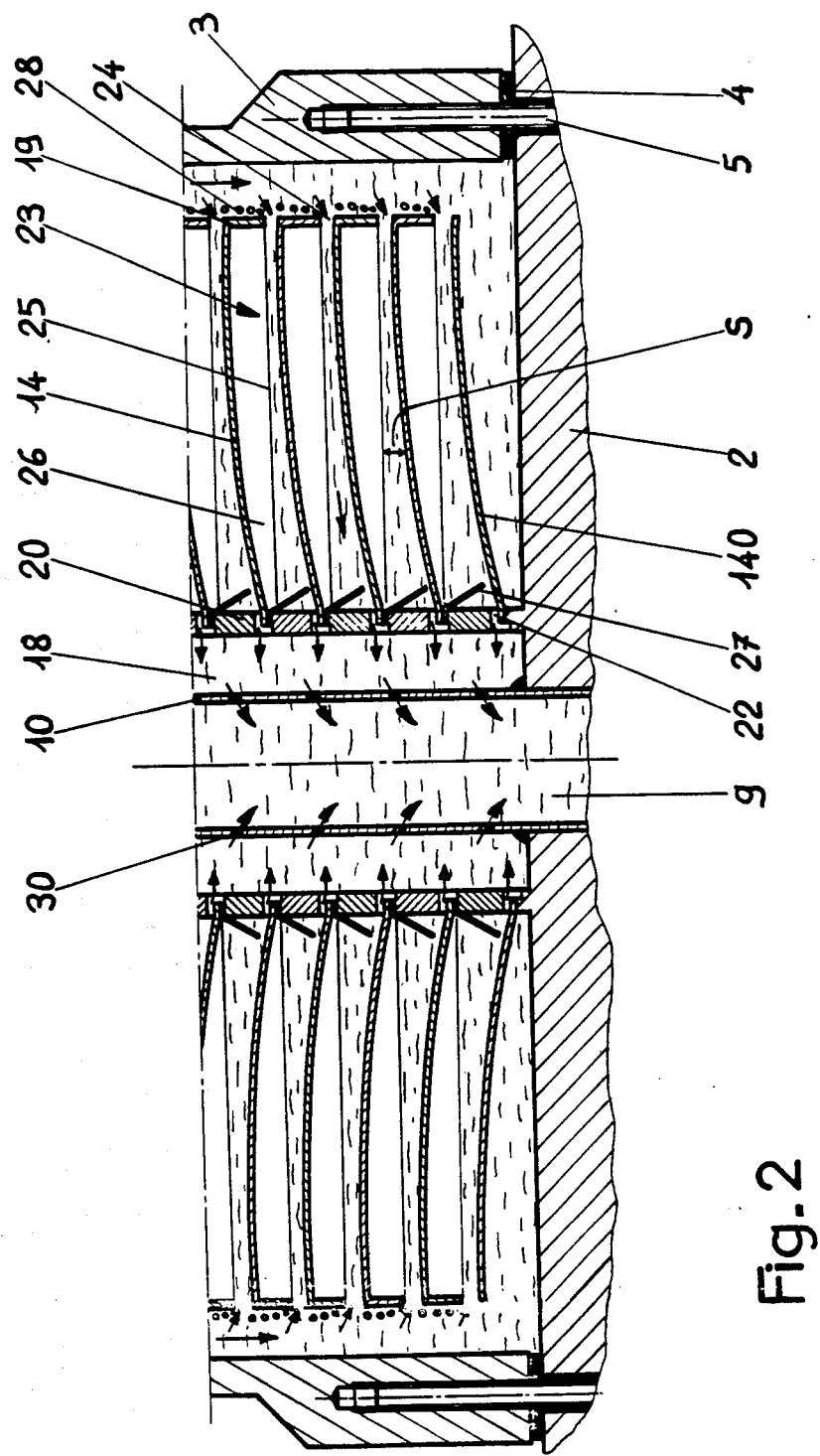
FIG. 2 is a more detailed view of a portion of the degasifier shown in FIG. 1 and, FIG. 3 is an underneath view in perspective and partly in section of one of the large number of plates with which the degasifier shown in FIG. 1 is equipped.
Figure 3:
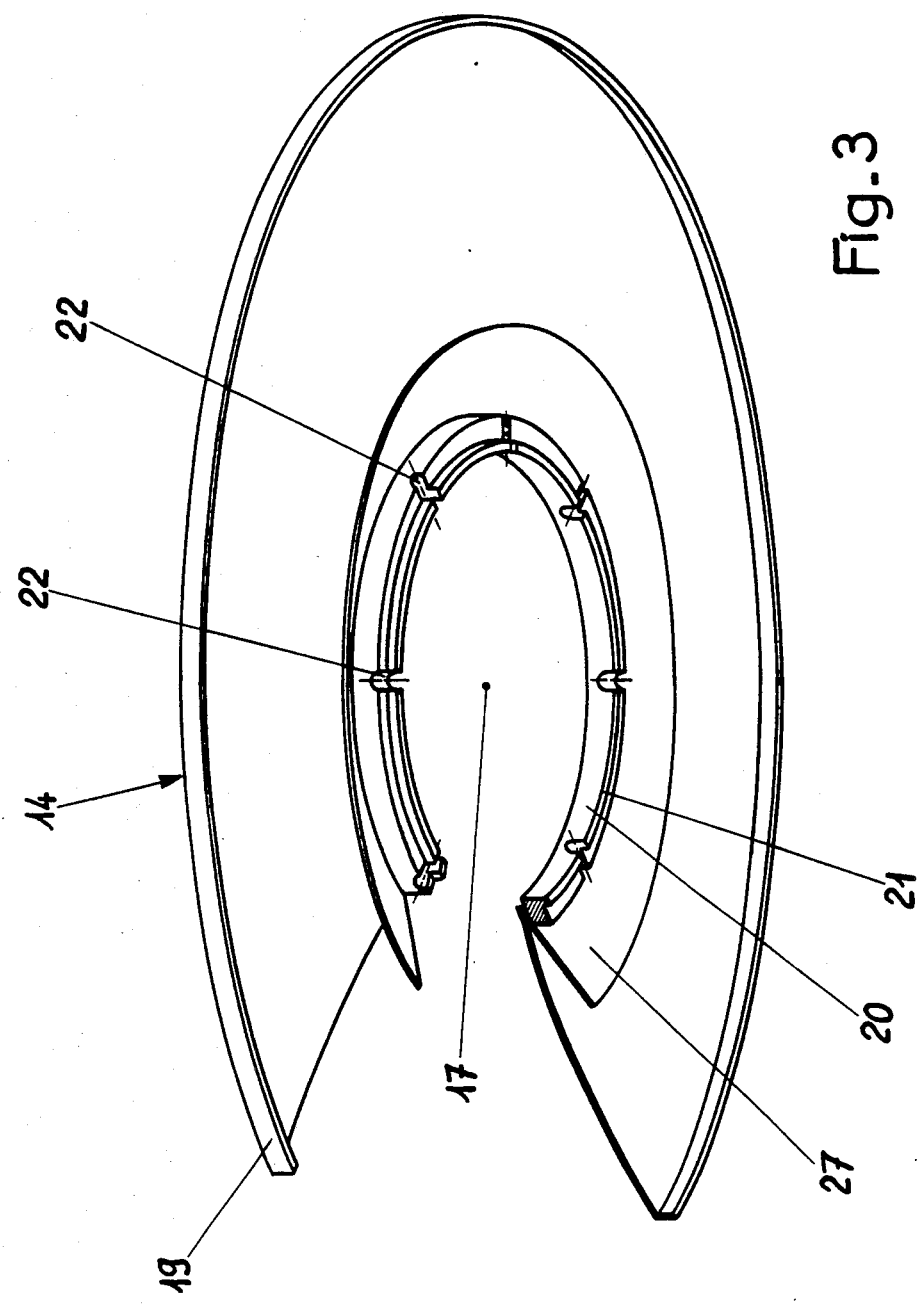

Referring now also to FIGS. 2 and 3, the container holds, below the minimum position of the level 12, a stack 13 of identical annular plates 14 forming a series of superposed degasification compartments 23 in accordance with the general means of French Pat. No. 2,448,378.

The stack 13 is formed by the simple stacking of plates 14, one of which is shown in perspective in FIG. 3, the plates being laid one on the other after the style of a pile of dishes, as can be seen in FIG. 2. In the container 1 the stack 13 is held in place and clamped on the base 2 with the aid of an elastic seal 15 and a nut 16 screwed onto the tube 10. It is therefore possible to remove the plates 14 one by one after lifting off the tube, unscrewing and removing the plate 11, and then unscrewing and removing the nut 16 and the seal 15. The plates 14, being annular, are provided with a central hole 17, so that the stack 13 has an axial passage 18 surrounding the tube 10.

As can be seen in FIGS. 2 and 3, each plate 14 is provided with a peripheral rim 19 and as central rim 20. The rim 20 has a shoulder 21 permitting correct centering of the plates on one another, and is provided with passages 22 intended to allow the liquid to pass from each compartment, formed between two plates 14, to the central passage 18. The outer rim 19 is of smaller height than the inner rim 20, so as to define, for each compartment 23, a circular peripheral opening 24 through which, on the one hand, the liquid charged with gas enters the compartment 23 and through which, on the other hand, the gas bubbles escape therefrom in the direction of the surface 12, as can be seen in FIG. 2, in which the gas bubbles are indicated, and in FIG. 1 in which the path of the gas is shown by arrows in broken lines.

In accordance with the general means of French Pat. No. 2,448,378, the level 25 of the liquid is established in each compartment 23 at the height of the top of the peripheral opening 24. Above this level there is formed in each compartment a gas pocket 26, of which large bubbles 28 escape continuously upwards via the opening 24 in proportion as the degasification process continues in the compartment 23.

The degasified liquid passes from the bottom of each compartment 23 to the passage 18 by way of the radial holes 22. In order to prevent gas being drawn into the passages 22 from the pocket 26 and reforming a liquid-gas mixture, each plate is provided with a frustoconical deflector 27 placed around the inner rim 20, as shown in the drawings.

In the embodiment illustrated, the bottom plate 140 has neither an outer rim 19 nor central passage apertures 22.

According to a particularly advantageous embodiment of the invention, each plate 14 has a curved shape with its concavity directed downwards, whereby it is given very great rigidity, its curvature in the radial direction (FIG. 2) being such that the section S for the radial passage of the liquid in the compartment 23 is constant. An elementary calculation will show that this curvature then corresponds to a part of a hyperbole of the form:

$$x.y = \text{constant,}$$

the constant being easily determined from the known value of the section of the inlet aperture 24, for example.

The passage section being kept constant and the flow being fixed, the liquid moves radially at a constant speed in the compartment 23, so that eddying detrimental to the degasification process is avoided. The gas bubbles can in fact rise to the surface only if they are not entrained elsewhere by currents moving through the liquid.

Similarly, the liquid injected into the passage 18 through the apertures 22 does not pass directly into the degasifier outlet aperture 9, since the speed of preparation of the liquid in the central passage increases progressively from top to bottom and therefore there would be a suction action via the radial passages 22 increasing in intensity from top to bottom, and this would give rise to eddying in the compartments. In order to avoid this action use is made of a central tube 10 provided with apertures 30, the number and/or diameter of which increase from top to bottom. Moreover, as can be seen in FIG. 2, these apertures 20 are advantageously inclined downwards, for example at about 45 degrees, in the direction of passage of the liquid, thus avoiding the creation of turbulence.

In the example illustrated the diameter of the apertures 30 is constant, but their number decreases from top to bottom, in such a manner that the section for the passage of the liquid through the wall of the tube 10 decreases progressively from top to bottom, in order to maintain, from top to bottom, a constant flow of liquid passing through this passage section.

In order to determine the optimum variation of the number of these apertures 30 from top to bottom, an experimental procedure is advantageous. For this purpose a model of transparent material, for example plexiglass, is made and the current of liquid is represented by adding aluminium powder and providing illumination. The number of holes 30 and their situation are then adjusted experimentally in such a manner as to obtain a flow of liquid with the least possible disturbance.

The degasifier shown in FIG. 1 operates in the following manner: the electrolytic liquid charged with gas bubbles, for example the catholyte charged with hydrogen bubbles passing out of the cathode compartments of the eletrolyser, is introduced into the degasifier axially and at the top through the elbowed pipe 8. It then falls onto the horizontal plate 11 and advances towards the edges of the latter, thus already giving rise to the evacuation towards the gas outlet aperture 6 of the largest bubbles of gas, that is to say about 90 to 95% of the gas bubbles contained in the electrolytic liquid.

The liquid charged with the remaining 5 to 10% of the bubbles then falls into the tank, in which, at the level of the surface 12, it joins the volume of liquid contained therein. It then moves downwards, as indicated by the arrows in solid lines in FIG. 1, in the space left between the stack 13 and the container 1, and in each compartment 23 is circulated from the periphery to the center (see also FIG. 2). The hyperbolic curvature of the plates 14 ensures a constant section for the passage of the liquid in each compartment 23, and therefore a constant speed, whereby, as has previously been seen, eddying is avoided. The gas accumulates in the pockets 26 and passes out thereof continuously through the inlets 24 in the form of large bubbles 28, which rise to the surface 12 to join the volume of gas situated thereabove and finally to be evacuated at 6 to the gas scrubber (not shown).

The degasified liquid passes out of each compartment through the apertures 22, passes through the distribution tube 20 via the apertures 30, and finally passes out at 9 through the base of the degasifier in the direction of the electrolyte recycling circuit rejoining the inlets of the electrolyser.

The speeds of propagation of the liquid in the compartments 23 being relatively low, numerous impurities are deposited at the bottom of these compartments, so that the plates must be cleaned periodically. For this purpose, the degasifier is completely dismantled in the following manner: After disconnecting the degasifier and emptying out the liquid contained in it, the cylindrical tube 3 is lifted off after removing the bolts 5. The plate 11 is unscrewed and removed, and the nut 16 is unscrewed and removed, followed by the seal 15. The plates 14 are then removed one by one and cleaned, and then the whole apparatus is reassembled in the reverse order. The shoulder 21 (FIG. 3) ensures correct centering of the plates on one another.

The invention is obviously not limited to the example of embodiment described above. Although a circular shape is preferable for the plates, for easily understandable reasons of manufacture, they could just as well have a different shape, for example a polygonal shape. The container could hold a plurality of stacks of plates instead of only one, their outlets advantageously being connected together either in or outside the container. It also need not have a vertically elongate shape, provided that its use as an expansion vessel is abandoned. In addition, instead of providing the inlet on the periphery of each stack of plates and the outlet in the central passage, it would on the contrary be possible to have the inlet via the central passage and the outlet via the periphery.

I claim:

1. A degasifier for an electrolysis plant, of the type comprising a dismountable container (1) provided with at least one inlet (7) for the elecrolytic liquid charged with gas, at least one outlet (9) for the degasified liquid, and at least one outlet (6) for the gas extracted, said container holding, set back relative to its inner wall, at least one stack (13) of plates (14) arranged in such a manner as to form superposed compartments (23), each stack being immersed in the electrolytic liquid and each compartment being provided with at least one upstream inlet aperture (24) for liquid charged with gas, and at least one downstream outlet aperture (22) for degasified liquid, wherein said stack is composed, after the style of a pile of dishes, of separable plates placed one on the other, each plate (14) being provided with a central hole (17), so that the stack, once formed, has a vertical passage (18) passing axially through it from top to bottom, and each plate (14) being in addition provided with respective outer (19) and inner (20) rims forming for each compartment (23) at least one peripheral opening (24) to the outside and at least one central opening (22) into said passage, while the degasifier is equipped with means for circulating the electrolytic liquid, in each compartment (23), between at least one peripheral opening (24) and at least one central opening (22), or vice versa.

2. A degasifier as claimed in claim 1, wherein each of said plates (14) has a curved shape with its concavity directed downwards.

3. A degasifier as claimed in claim 2, wherein the curvature of each plate (14) is selected in such a manner that the section (S) for the radial passage of the eletrolytic liquid will be constant in the compartment (23) which it defines together with the plate above it.

4. A degasifier as claimed in any one of claims 1 to 3, wherein said plates (14) each have an annular shape.

5. A degasifier as claimed in claim 4, wherein each of said plates (14) is equipped with a frustoconical deflector (27) placed around its inner rim (20) and extending downwards.

6. A degasifier as claimed in any one of claims 1 to 3, wherein said container (1) has an elongate shape in the vertical direction.

7. A degasifier as claimed in claim 6, wherein said container (1) is tubular and contains a single stack of plates (14) disposed in its longitudinal axis.

8. A degasifier as claimed in any one of claims 1 to 3, which comprises in addition a liquid flow distribution tube (10) situated in said passage coaxially to the latter.

9. A degasifier as claimed in claim 7, of the type in which the liquid circulates in the compartments (23) from the periphery to the center and in the central passage from top to bottom, wherein the apertures (30) for the passage of the liquid through the distribution tube (10) are inclined downwards in the direction of passage of the flow of liquid.

10. A degasifier as claimed in claim 8, of the type in which the liquid circulates in the compartments from the periphery to the center and in the central passage from top to bottom, wherein the apertures (30) for the passage of the liquid through the distribution tube are formed in such a manner that the section for the passage of the liquid through the wall of said tube decreases progressively from top to bottom so as to maintain from top to bottom a constant flow of liquid passing through said passage section.

* * * * *

UNITED STATES PATENT AND TRADEMARK OFFICE
CERTIFICATE OF CORRECTION

PATENT NO.   : 4,624,687
DATED        : Nov. 25, 1986
INVENTOR(S)  : Gerard Pere It is certified that error appears in the above-identified patent and that said Letters Patent is hereby corrected as shown below:

On the Title Page add:

-- [30]  Foreign Application Priority Data

Dec. 23, 1983        France        58-20676  --.

Signed and Sealed this

Fifth Day of April, 1988

Attest:

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,624,687
DATED : Nov, 25, 1986
INVENTOR(S) : Gerard Pere

It is certified that error appears in the above-identified patent and that said Letters Patent is hereby corrected as shown below:

On the title Page add:

-- (30) Foreign Application Priority Data

Dec. 23, 1983      France      83-20676 --.

This certificate supersedes Certificate of Correction issued April 5, 1989,

Signed and Sealed this

Second Day of January, 1990

Attest:

JEFFREY M. SAMUELS

*Attesting Officer*     *Acting Commissioner of Patents and Trademarks*